March 27, 1951 — R. V. ADDUCI — 2,546,289
ALARM CLOCK
Filed Jan. 16, 1947
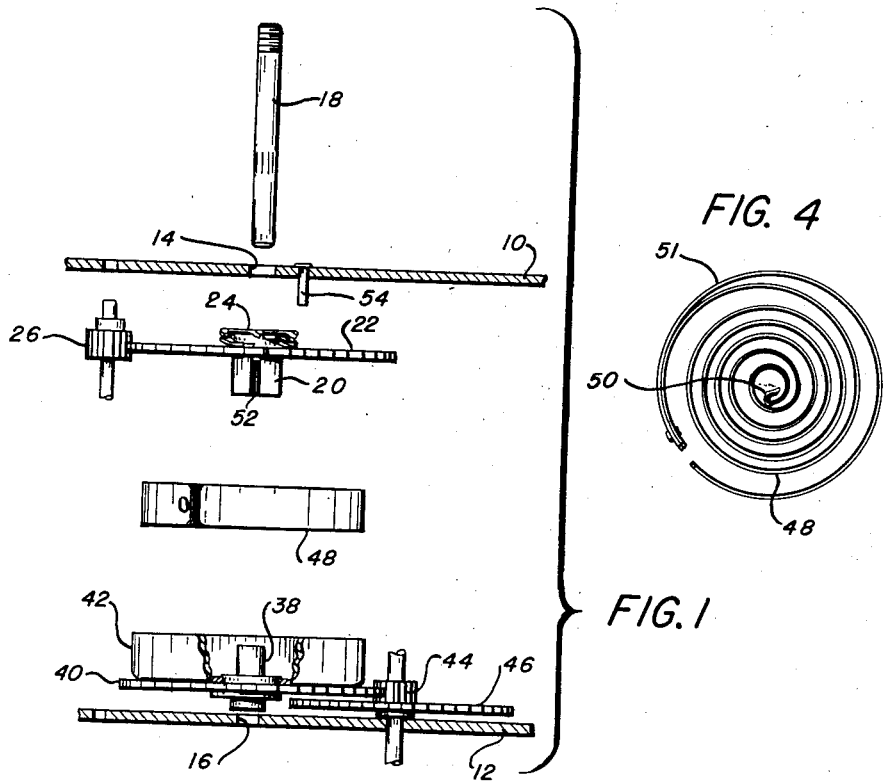
FIG. 1
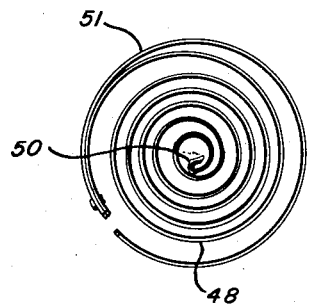
FIG. 4
FIG. 3
FIG. 2
INVENTOR.
RAYMOND V. ADDUCI
BY
ATTY.
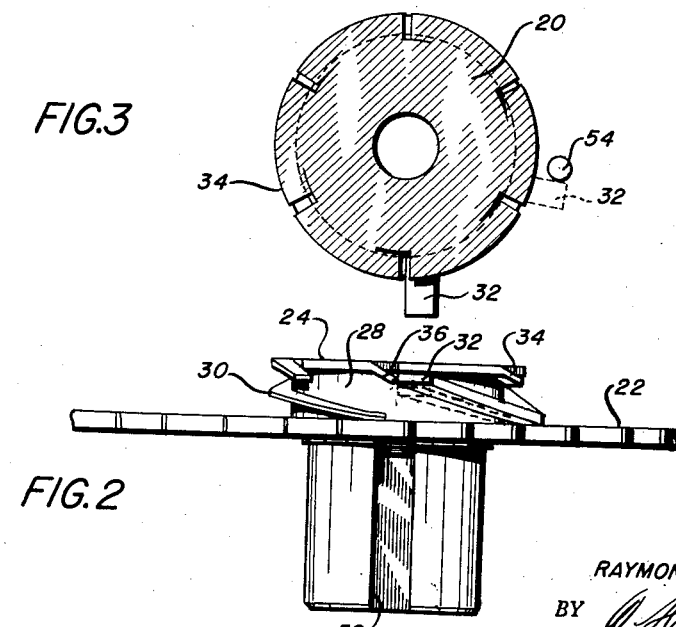

Patented Mar. 27, 1951

2,546,289

UNITED STATES PATENT OFFICE 2,546,289

ALARM CLOCK

Raymond V. Adduci, Waterbury, Conn., assignor to The United States Time Corporation, Waterbury, Conn., a corporation of Connecticut Application January 16, 1947, Serial No. 722,334

5 Claims. (Cl. 58—21.1)

This invention relates in general to alarm clocks of the type wherein both the time train and the alarm train are driven by a single main spring. In alarm clocks of this type, it is desirable that the alarm train be allowed to operate only for a certain definite length of time during the sounding of the alarm in order that the main spring will not completely run down even though the alarm should be allowed to run its full course. It is also important that the mechanism which is employed for preventing the alarm from running for more than the certain length of time be of such character that the frame plates of the movement will not have to be spaced apart by an undue amount in order to accommodate the mechanism.

It is an object of this invention to provide a mechanism which will stop the alarm train after it has run for a certain length of time during the alarm sounding period.

It is a specific object of this invention to provide a means operable upon the main wheel of the alarm train for stopping said main wheel after it is turned through one revolution or less than one revolution during the sounding of the alarm.

It is a further specific object of this invention to provide a means for stopping the alarm train after the alarm has operated for a definite length of time which can readily be accommodated between the frame plates of the movement without requiring that the frame plates be spaced apart by an abnormal amount.

Referring now to the drawing:

Fig. 1 is an exploded view of a portion of an alarm clock showing the power plant of the clock and the other elements closely associated therewith.

Fig. 2 is a side elevational view of the alarm train main wheel and its mounting hub.

Fig. 3 is a partial plan view of the hub of the alarm train main wheel and the wheel stopping elements associated therewith.

Fig. 4 is a side elevational view of the coiled main spring.

Referring now to Fig. 1, the frame plates of the movement are indicated at 10 and 12. Openings 14 and 16 are provided in the plates 10 and 12 respectively, and a winding arbor 18 is rotatably mounted within the openings 14 and 16. The winding arbor 18 is provided at its outer end with the usual winding key, not shown.

Press fitted upon the winding arbor 18 is a hub 20 of the alarm train main wheel 22. The hub 20 is rigidly connected with the wheel 22 in any desired manner such as by staking and is provided at one end with a radial flange 24. The wheel 22 meshes with a pinion 26, said pinion being drivingly connected with the second wheel of the alarm train in the usual manner. A one-way drive connection (not shown) is incorporated at a suitable location in the time train to permit winding. The hub 20 has a diameter on the outer side of the wheel 22 which is slightly larger than the diameter of the hub 20 on the inside of the wheel, and this larger diameter is provided with a smooth surface 28.

A resilient member 30, here shown in the form of a flat, coiled, spring-like member, is provided about the surface 28; and the member 30 is provided with a tail 32 for a purpose to be presently described. The resiliency of the member 30 is such that the opposite ends thereof tend to expand in a direction axially of the hub 20 so that the tail 32 will frictionally engage the side of the flange 24. To insure such expansion, the member 30 is actually irregularly shaped so as to provide portions which will respectively engage either the surface of wheel 22 or portions of flange 24 in such a manner that the tail 32 will always be urged against the flange 24.

The flange 24 of the hub 20 is provided with a plurality of preferably evenly spaced inwardly extending projections 34 which have inclined surfaces 36 on one side thereof terminating at their outer ends in abrupt shoulders.

Rotatably mounted upon the winding arbor 18 is the hub 38 of the time train main wheel 40. A barrel 42 is secured to the time train main wheel 40 and to the hub 38 and in any suitable manner such that the hub 38, wheel 40, and barrel 42 form a unitary assembly. The time train main wheel 40 meshes with a pinion 44 secured to or formed integrally with a wheel 46 which is the second wheel of the time train.

The main spring of the clock is shown at 48, and it is provided at its inner end with a hook 50 which, in assembled condition of the clock, fits within a slot 52 provided in the hub 20 of the alarm train main wheel 22. The main spring 48 is drivingly connected with the barrel 42 in any usual or convenient manner, for example, by a tail 51 which frictionally engages the inner surface of the barrel.

A stop 54 is mounted in the frame plate 10 in a position to engage the tail 32 of the member 30. As will readily be seen in Fig. 3, when the hub 20 is turned in a clockwise direction and the tail 32 has come up against the upper side of the stop 54, the hub may continue to turn in a clockwise direction and the tail 32 will ratchet over the projections 34 of the flange 24. Assuming now that the tail 32 is in engagement with the upper side of stop 54; as seen in Fig. 3, it will be observed that should the hub 20 turn in a counterclockwise direction, the tail 32 will also move around in a counterclockwise direction due to the friction between the tail 32 and the flange 24 until the tail 32 has moved into engagement with the under side of the stop 54, as shown in dotted lines in Fig. 3. After the tail 32 has moved into engagement with the under side of the stop 54, the hub 20 may continue to rotate in a counterclockwise direction only until the nearest projection 34, considered in clockwise direction, comes into engagement with the side of the tail 32, at which time no further rotation of the hub 20 can take place.

In operation, the winding arbor 18 is turned in a clockwise direction to wind the clock, and after the hub 20 has moved through one revolution, the tail 32 will come into engagement with the stop 54; but as heretofore explained, the hub 20 may continue to be rotated for as long as is necessary to completely wind the clock, the tail 32 ratcheting over the projections 34. In the usual construction, this clockwise movement will require about nine or ten revolutions to completely wind the clock from a completely unwound condition.

When the hour hand of the clock has reached the point for which the alarm has been set, the usual alarm release mechanism will come into effect to allow the alarm train to be driven by the main spring 48. The spring 48 will then drive the hub 20 and the alarm train main wheel 22 in a counterclockwise direction for only substantially one revolution until the tail 32 has come into engagement with the side of the stop 54 as heretofore explained.

Though not illustrated, it will readily be appreciated that a second stop 54 may be provided on the diametrically opposite side of the hub 20, and that if such were the case, the alarm train main wheel would then be driven by the spring 48 in an alarm sounding direction through only substantially one half of a revolution. It is also obvious that the alarm train main wheel 22 may be allowed to rotate through any part of a revolution by a proper placement of the second stop 54. In the preferred embodiment, as shown in the drawing, only one stop 54 is provided because it has been found that one revolution of the alarm train main wheel will cause the alarm to be sounded for a sufficient length of time and will not unnecessarily deprive the time train of its share of the power of the main spring.

While the invention has been illustrated and described in its preferred embodiment and has included certain details, it should be understood that the invention is not to be limited to the precise details herein illustrated and described since the same may be carried out in other ways, falling within the scope of the invention as claimed.

What I claim is:

1. In a timepiece having a time train and an alarm train supported by a frame and a single spring for driving both trains; a winding arbor, an alarm train main wheel fixed to said arbor and having a hub; said hub having a radial flange thereon, a resilient member mounted on the hub and having a radially projecting tail engaging said flange, said flange having ratchets on one side thereof to be engaged by the tail of the resilient member, whereby the tail of the resilient member will move past the ratchets in one direction but not in the other direction, a stop fixed in a position to be engaged by the tail of the resilient member whereby the alarm train main wheel may be freely manually rotated in one direction but cannot be rotated in the other direction substantially more than one revolution.

2. In a timepiece having a time train and an alarm train supported by a frame and a single spring for driving both trains; a winding arbor, an alarm train main wheel fixed to said arbor and having a hub, said hub having a radial flange thereon, a resilient member mounted on said hub and having a radially projecting tail engaging said flange, said flange having projections extending from one side thereof and engaged by the tail of the resilient member, said projections having inclined surfaces on one face thereof and abrupt surfaces on the other face thereof, whereby the tail of the resilient member will ratchet over the projections in one direction but not in the other direction, a stop fixed in a position to be engaged by the tail of the resilient member whereby the main alarm wheel may be freely manually rotated in one direction but cannot be rotated in the other direction substantially more than one revolution.

3. In a timepiece having a time train and an alarm train supported by a frame and a single spring for driving both trains; a winding arbor, an alarm train main wheel fixed to said arbor and having a hub, said hub having a radial flange thereon, a member mounted on said hub and having a radially projecting tail resiliently engaging said flange, said flange having projections extending from one side thereof toward said wheel and engaged by the tail of the member, said projections having inclined surfaces on one face thereof and abrupt surfaces on the other face thereof, whereby the tail of the resilient member will ratchet over the projections in one direction but not in the other direction, a stop fixed in a position to be engaged by the tail of the member whereby the main alarm wheel may be freely manually rotated in one direction but cannot be rotated in the other direction substantially more than one revolution.

4. In a timepiece having a time train and an alarm train supported by a frame and a single spring for driving both trains; a winding arbor, an alarm train main wheel fixed to said arbor and having a hub extending in opposite directions from the center of the wheel, one end of said hub being constructed and arranged to engage the inner end of the spring and the other end of the hub having a radial flange thereon, a resilient member mounted on the end of the hub having the flange and said member having a radially projecting tail engaging said flange, said flange having projections extending from one side thereof toward said wheel and engaged by the tail of the resilient member, said projections having inclined surfaces on one face thereof and abrupt surfaces on the other face thereof, whereby the tail of the resilient member will ratchet over the projections in one direction but not in the other direction, a stop fixed in a position to be engaged by the tail of the resilient member whereby the main alarm wheel may be freely manually rotated in one direction but cannot be rotated in the other direction substantially more than one revolution.

5. In a timepiece, a winding arbor, a hub of an alarm train main wheel fixed thereon, said hub having a radial flange at the outer end thereof, at least one ratcheting portion on the inner face of the flange, a member coiled around the hub and having a tail, said tail being constructed and arranged to be resiliently urged into engagement with said flange.

RAYMOND V. ADDUCI.

REFERENCES CITED

The following references are of record in the file of this patent:

FOREIGN PATENTS

| Number | Country | Date |
|---|---|---|
| 106,662 | Austria | June 25, 1927 |